UNITED STATES PATENT OFFICE.

PAUL W. TURNEY, OF PORTLAND, OREGON.

PROCESS OF MAKING AND NEW FOOD PRODUCT OF MILK.

1,274,218.　　　　Specification of Letters Patent.　　Patented July 30, 1918.

No Drawing.　　Application filed March 22, 1917.　Serial No. 156,783.

*To all whom it may concern:*

Be it known that I, PAUL W. TURNEY, a citizen of the United States, and a resident of Portland, county of Multnomah, State of Oregon, have invented a certain new and useful Process of Making and New Food Product of Milk, of which the following is a specification.

I have discovered that in the process of making curd from the casein of milk there is a stage when the curd particles are in the form of fine flakes which will precipitate in a jelly-like mass, resembling cream. And if maintained in this state by low temperature it constitutes an easily digested, wholesome article, suitable for preparing many palatable foods and drinks. For example, the article so produced is adapted for being used as a substitute, in many instances, for the cream of milk in preparing articles of food; also in making a product resembling ice cream; and at soda fountains in the preparation of various drinks.

The articles so prepared, furthermore, have a special advantage from the standpoint of digestibility, and of economy. With some persons the fat of cream does not agree. For such my article is specially suited, for my product may be made from skimmed milk if desired. And since skimmed milk is frequently a mere leftover product, having only a limited use, by my discovery this skimmed milk is given a commercial value.

I produce my product by proceeding, in the first instance, as in the case of artificially producing curd from the casein of milk. But the process is permitted to develop only to a certain stage, and is then arrested by refrigeration, that is, by the rapid reduction of the temperature to the point where the enzym used for the product is rendered inactive. A flocculent curd is so produced which is permitted to settle, and then the whey is poured off. The low temperature must be maintained until the product is consumed.

In detail, the process which I pursue for producing my product is as follows:

I first heat the milk to from 80° to 100° Fahrenheit in order to ripen it, that is, place it in that state best suited for curdling by the addition of an enzym. I then add the enzym, such as rennet or pepsin; said temperature being maintained during the curdling process so as to facilitate the coagulation of the casein of the milk. The proper stage in the curdling process is ascertained by taking some of the curd between two fingers and noticing whether the curd particles have attained a tendency to stick together when the fingers are separated. When this stage has been reached the temperature of the milk must be rapidly lowered to approximately 45° Fahrenheit so as to render the enzym inactive. The proper consistency to be attained in the coagulated particles before the curdling is stopped, as mentioned, is a matter to be learned by experience, and must be left to the judgment of the operator, because by it the quality of the product obtained is determined.

During the rapid cooling of the milk it is necessary that the same be gently agitated for the purpose of breaking up the adhesion of the coagulated curd particles and thus releasing the whey. The article is then allowed to stand for a sufficient length of time to permit the curd particles to settle; said low temperature being maintained. This settling usually takes from 2 to 12 hours according to the degree of separation to be effected between the particles and the whey. The latter is then poured off, and the residue will be found to be a mass of creamy consistency, and such residue may be greatly beaten or whipped to obtain a more even texture. Coloring, flavoring, sweetening and other materials, for example, cream, may be added as desired. If the beating is done in an ice cream freezer a product simulating ice cream is produced.

The product must be kept at said low temperature until consumed, for if the temperature be permitted to rise to the degree rendering the enzym active again, the curdling will be renewed and rapidly carried to such degree as to render the product wholly unfit for the use mentioned.

By the term low temperature I intend any temperature of approximately 45° Fahrenheit or lower.

I claim:

1. The process for making the described food product of milk consisting in taking fresh milk, inducing curdling therein by the agency of an enzym, permitting the curdling to develop until the curd particles attain a tendency to adhere, then arresting further coagulation by a rapid reduction of the milk to that temperature rendering the enzym inactive, and maintaining the mass at said low temperature until used.

2. The process for making the described food product of milk consisting in taking fresh milk, inducing curdling therein by the agency of an enzym, permitting the curdling to develop until the curd particles attain a tendency to adhere, then arresting further coagulation by a rapid reduction of the milk to that temperature rendering the enzym inactive, then pouring off the whey and maintaining the precipitate at said low temperature until used.

3. The process of making a milk food product, consisting of taking fresh milk, inducing curdling thereof by an enzym, permitting the curdling to develop until the precipitate obtained will have a flocculent, slightly adherent consistency, then arresting further curdling by low temperature rapidly induced, gently agitating the mass, then permitting the precipitate to settle, pouring off the whey, and maintaining the stability of the precipitate by low temperature.

4. A milk food product comprising a flocculent slightly adherent fresh-milk casein precipitate induced by an enzym, the action of which was arrested, upon the precipitate becoming flocculent, by an immediate reduction in temperature, said precipitate being partially separated from the milk stock and inhibited from further change by being maintained at a low temperature.

PAUL W. TURNEY.